United States Patent
Kawaguchi et al.

(10) Patent No.: US 10,870,502 B2
(45) Date of Patent: Dec. 22, 2020

(54) VAPOR JET SYSTEM ENABLING JETTING FOR MANY SECONDS USING MULTIPLE KINDS OF MUTUALLY INSOLUBLE LIQUID GASES AS FUEL

(71) Applicant: Japan Aerospace Exploration Agency, Tokyo (JP)

(72) Inventors: Junichiro Kawaguchi, Sagamihara (JP); Osamu Mori, Sagamihara (JP); Takayuki Yamamoto, Sagamihara (JP); Norizumi Motooka, Sagamihara (JP); Toshihiro Chujo, Sagamihara (JP)

(73) Assignee: Japan Aerospace Exploration Agency, Tokyo (JP)

( * ) Notice: Subject to any disclaimer, the term of this patent is extended or adjusted under 35 U.S.C. 154(b) by 565 days.

(21) Appl. No.: 15/310,419

(22) PCT Filed: May 11, 2015

(86) PCT No.: PCT/JP2015/063463
§ 371 (c)(1),
(2) Date: Nov. 10, 2016

(87) PCT Pub. No.: WO2015/174366
PCT Pub. Date: Nov. 19, 2015

(65) Prior Publication Data
US 2017/0073089 A1    Mar. 16, 2017

(30) Foreign Application Priority Data
May 13, 2014  (JP) .................................. 2014-099693

(51) Int. Cl.
*B64G 1/40*    (2006.01)
*F03H 99/00*    (2009.01)
(Continued)

(52) U.S. Cl.
CPC ............. *B64G 1/401* (2013.01); *B64G 1/402* (2013.01); *F02K 9/50* (2013.01); *F02K 9/605* (2013.01); *F02K 99/00* (2013.01); *F03H 99/00* (2013.01)

(58) Field of Classification Search
CPC . B64G 1/26; B64G 1/40; B64G 1/401; B64G 1/402; F02K 9/50; F02K 9/605; F02K 99/00; F03H 99/00
See application file for complete search history.

(56) References Cited

U.S. PATENT DOCUMENTS

| 4,802,333 A | 2/1989 | Smith |
| 2009/0007541 A1 | 1/2009 | Kawaguchi et al. |

(Continued)

FOREIGN PATENT DOCUMENTS

| JP | 2008-144588 A | 6/2008 |
| JP | 2009-214695 A | 9/2009 |

(Continued)

OTHER PUBLICATIONS

Extended European Search Report (EESR) dated Dec. 7, 2017, from corresponding EP Appl No. 15792862.3, 7 pp.

(Continued)

*Primary Examiner* — Scott J Walthour
(74) *Attorney, Agent, or Firm* — Studebaker & Brackett PC

(57) ABSTRACT

A vapor jet system to continuously jet vapors while suppressing cavitation. One vapor jet system includes a liquid storage part for separately storing two or more kinds of mutually insoluble liquids; a jet orifice; and a jet control part. Jetting the vapors is from a state where pressure in the space storing the vapors in the liquid storage part is higher than the saturated vapor pressure in any of the two or more kinds of liquids. Alternatively, a vapor jet system can include a fluid storage part storing one kind of liquid and at least one kind of inactive gas having a composition different from the liquid; a similar jet orifice; and a similar jet control part. Jetting the vapors and inactive gas(es) is (are) from a state where pressure in a vapor storing space in the fluid storage part is higher than the saturated vapor pressure in the liquid.

8 Claims, 10 Drawing Sheets

(51) Int. Cl.
  *F02K 9/50*   (2006.01)
  *F02K 99/00*  (2009.01)
  *F02K 9/60*   (2006.01)

(56)      References Cited

U.S. PATENT DOCUMENTS

| | | |
|---|---|---|
| 2009/0223203 A1 | 9/2009 | Yamamoto et al. |
| 2011/0214408 A1 | 9/2011 | Yamamoto et al. |
| 2011/0214410 A1 | 9/2011 | Yamamoto et al. |
| 2014/0345464 A1* | 11/2014 | Behruzi ................ B01D 45/08 96/134 |

FOREIGN PATENT DOCUMENTS

| | | |
|---|---|---|
| JP | 2011-183840 A | 9/2011 |
| JP | 2011-183841 A | 9/2011 |

OTHER PUBLICATIONS

International Search Report issued in PCT/JP2015/063463; dated Jul. 28, 2015.
Written Opinion issued in PCT/JP2015/063463; dated Jul. 28, 2015.
Seubert et al.; Refrigerant-Based Propulsion System for Small Spacecraft; American Institute of Aeronautics and Astronautics; 43rd AIAA/ASME/SAE/ASEE Joint Propulsion Conference & Exhibit; AIAA 2007-5131; Jul. 7-11, 2007; pp. 1-13; Cincinnati, OH, USA.
Amri et al.; In orbit performance of butane propulsion system; Advances in Space Research 49; 2012; pp. 648-654.

\* cited by examiner

FIG.9
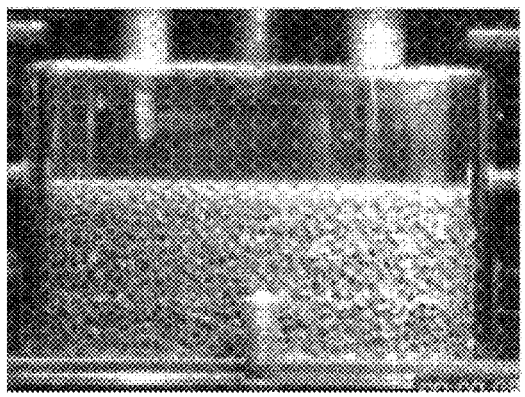
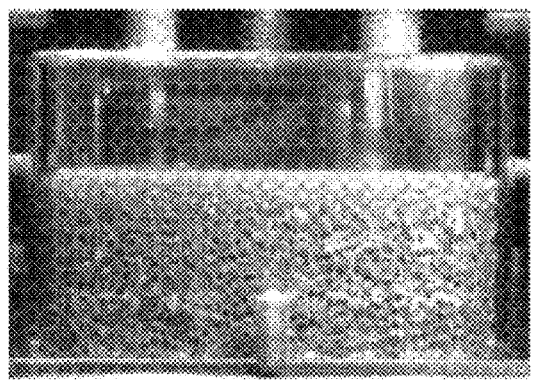
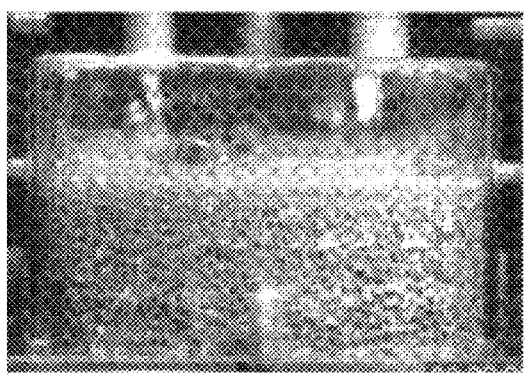

FIG.10
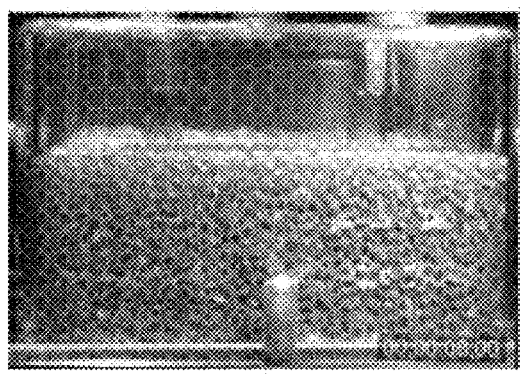
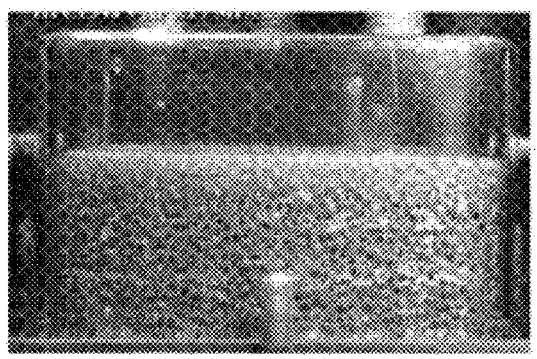
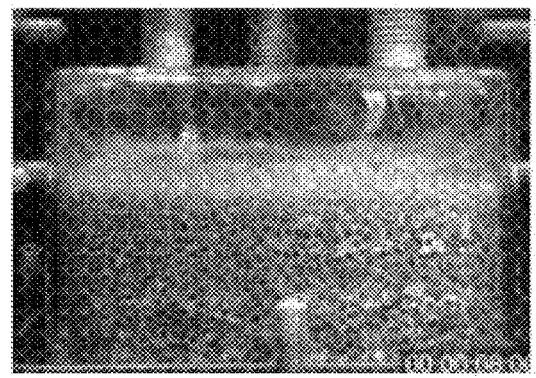

VAPOR JET SYSTEM ENABLING JETTING FOR MANY SECONDS USING MULTIPLE KINDS OF MUTUALLY INSOLUBLE LIQUID GASES AS FUEL

FIELD OF THE INVENTION

The present invention relates to a vapor jet system. In particular, the present invention relates to a vapor jet system usable for a thruster (propulsion device) system for a small spacecraft etc., and a thruster using that system.

BACKGROUND OF THE INVENTION

In recent years, a gas-liquid equilibrium thruster has been developed which uses a liquid gas as a fuel and which jets out the fuel as a cold gas jet (Non-Patent Document 1). A gas-liquid equilibrium thruster can load a tank with a fuel in a higher density relative to a conventional cold gas jet which stores GN2 (gaseous nitrogen) or GHe (gaseous helium) in a high density. Therefore, the gas-liquid equilibrium thruster is advantageous in that a tank can be smaller, the inner pressure in the tank is kept at the vapor pressure of the liquid gas and thus a constant thrust force can be output without a pressure-adjusting valve and the plumbing can be simplified.

On the other hand, a gas-liquid equilibrium thruster is required to have a function to separate a gas phase and a liquid phase even in a non-gravity space to surely jet out only the gas phase. There are following technologies with regard to a technology for jetting out only a gas from a nozzle.

Vapor Jet System in which a Foam Metal is Constructed

The vapor jet system realizes gas-liquid separation by osmosing a fuel in liquid state into a foam metal to keep the liquid in the foam metal by surface tension on the gas-liquid interfaces tensed among gas cavities in the foam metal (Patent Document 1). However, in a vapor jet system using a single liquid gas as a fuel, the ability of gas-liquid separation depends on the surface tension on the gas-liquid interfaces, and jetting is limited to a pulse-like jetting due to the strength of the surface tension. Therefore, jetting of gas for a long time with significantly decreasing the gas pressure in the tank is difficult due to the ability of gas-liquid separation of the foam metal, and if jetting during a time beyond the ability is conducted, there is a risk that cavitation occurs from inside of liquid, the fuel in a liquid state causes bumping and outflows from the tank.

Vaporization Method by Heating with a Heater Near a Nozzle (Resistojet)

It is a method of vaporizing a fuel in a liquid state by compulsory heating near a nozzle (Non-Patent Document 2). The method has a defect in that it needs huge electric power to be supplied for provoking vaporization, and it contradicts the original merit of enabling downsizing or simplification.

PRIOR ART DOCUMENTS

Patent Documents

PATENT DOCUMENT 1: JP 2009-214695 A
PATENT DOCUMENT 2: JP 2011-183840 A
PATENT DOCUMENT 3: JP 2011-183841 A

Non-Patent Documents

NON-PATENT DOCUMENT 1: Carl R. Seubert1, Henry J. Pernicka2, Chris L. Norgren, "Refrigerant-Based Propulsion System for Small Spacecraft", AIAA 2007-5131

NON-PATENT DOCUMENT 2: Redha Amri, D. Gibbon, "In orbit performance of butane propulsion system", Advances in Space Research 49 (2012) pp. 648-654

SUMMARY OF THE INVENTION

Problem to be Solved by the Invention

As described above, it was difficult to jet out for a long time in conventional small, simple vapor jet systems using a single liquid gas as a fuel.

In a vapor jet system using a single fuel using a liquid gas such as substitute CFC gas, isobutane, etc. as a fuel, the pressure in the tank falls below the saturated vapor pressure of the liquid gas shortly after the beginning of jetting out and cavitation occurs from the inside of the liquid fuel since the jetting out is started from the state where the tank pressure is equal to the saturated vapor pressure of the liquid gas. If jetting out of gas is continued after occurrence of cavitation, there is a risk that gas bubbles occurred by the cavitation become bloated, bumping of the fuel is induced, and the fuel in the liquid state outflows from the tank. If the liquid fuel which outflowed from the tank is jetted out without being vaporized, the jet efficiency will decrease and the thrust force will become unstable.

In view of this, the present invention aims, in a vapor jet system, to provide a vapor jet system for suppressing cavitation assuming that a gas is continuously jetted out.

Means for Solving the Problem

In the following, means by the present invention for solving the above problem will be outlined, and then specific solutions provided by the present invention will be explained. However, it should be noted that the present invention is not required to include all configurations outlined or explained below as solutions, and the technical scope of the present invention is defined by the description of claim scope.

CONCEPT OF THE PRESENT INVENTION

Inventors of the present invention focused on the fact that, when two kinds of mutually insoluble liquid gases are mixed, the vapor pressure in the tank is equal to the sum of the saturated vapor pressures of the respective liquid gases in the equilibrium state. The inventors thought that the tank pressure at the beginning of the jetting out of gas would become higher than the saturated vapor pressure of the respective liquid gases by using two kinds of liquid gases, and as a result, that the above problem would be solved by suppressing cavitation while jetting out. The inventors reached the present invention in this way. That is, the present invention is an invention with regard to selection of fuels for enabling continuous jetting out of gas in a vapor jet system.

In the following (except the after-mentioned respective embodiments), the liquid gas with higher saturated vapor pressure in the two kinds of liquid gases is denoted as liquid gas A, and the saturated vapor pressure of the liquid gas A is denoted as PA. The liquid gas with lower saturated vapor pressure is denoted as liquid gas B, and the saturated vapor pressure of the liquid gas B is denoted as PB. In the vapor jet system taught by the present invention, the gas pressure in the tank in the equilibrium state is equal to the sum of the saturated vapor pressures of the respective liquid gases (PA+PB) by mixing gas phases of two kinds of mutually insoluble liquid gases.

Since the gas-liquid interface of the two kinds of the respective liquid gases experiences a pressure of the sum of the saturated vapor pressures of the two kinds (PA+PB), cavitation will occur in the respective liquid fuels after the gas pressure in the tank falls below the saturated vapor pressure PA of the liquid gas A. Therefore, cavitation will not occur in the jetting out of gas until the pressure decreases from the tank pressure before jetting out PA+PB to PA, that is until decrease of pressure by the amount of the saturated vapor pressure PB of the liquid gas B. Since a continuous jetting out of gas is possible until occurrence of cavitation, gas amount which can be continuously jetted out can be increased by selecting a liquid gas B with a high saturated vapor pressure (a saturated vapor pressure close to the saturated vapor pressure PA of the liquid gas A). In this regard, as specific examples of combination of liquid gas fuels in the present invention, liquid ammonia and liquid butane, ammonia water and liquid butane etc. can be cited.

Furthermore, by filling a conventional single liquid gas using a conventional fuel such as isobutane, substitute CFC, etc., with inactive gas such as nitrogen, helium, etc., the gas pressure in the tank will become higher no less than the saturated vapor pressure of the single liquid gas, thus it becomes possible to suppress cavitation while jetting out.

Specific Solutions

Specifically, the present invention provides a vapor jet system comprising: liquid storage part for separately storing two or more kinds of mutually insoluble liquids; a jet orifice for jetting out vapors generated by vaporization of the two or more kinds of liquids inside of the liquid storage part; and a jet control part for controlling the jetting out of the vapors from the jet orifice, wherein the system is configured to start jetting out of the vapors from a state where the pressure in the space storing the vapors in the liquid storage part is higher than the saturated vapor pressure in any of the two or more kinds of liquids.

By the above configuration, vapor jetting out can be started from a gas pressure higher than conventional ones, and thus jetting out for a long time becomes possible. As examples of two or more kinds of mutually insoluble liquids, liquid ammonia or ammonia water and liquid butane can be used, as described above.

The above vapor jet system of the present invention can further comprise heaters for heating the liquid storage part. By those heaters, it becomes possible to recover the temperatures of the liquids by heating the liquids in intervals of jetting out, or to make a difference in temperatures among the space storing the vapors and the space storing the liquid in the after-mentioned system configuration shown in FIG. 3.

In the above vapor jet system of the present invention, the liquid storage part can further comprise two or more liquid holding members for holding each one of the two or more kinds of liquids. As described in Patent Documents 1-3, by providing a foam metal or a flat plate (droplet capture member) etc. in the liquid storage part, it becomes possible to restrict free motions of liquid to prevent sloshing phenomenon and to prevent the liquid from being jetted out from the jet orifice. Since the above vapor jet system of the present invention separately stores two or more of liquids, the liquid holding members are provided also for each liquid.

In addition the present invention provides a vapor jet system comprising: a fluid storage part storing one kind of liquid and at least one kind of inactive gas having a composition different from the liquid; a jet orifice for jetting out vapors generated by vaporization of the liquid inside of the fluid storage part and the at least one kind of inactive gas; and a jet control part for controlling the jetting out of the vapors and the at least one kind of inactive gas from the jet orifice, wherein the system is configured to start jetting out of the vapors and the at least one kind of inactive gas from a state where the pressure in the space storing the vapors in the fluid storage part is higher than the saturated vapor pressure in the liquid. Even if a single liquid is used, jetting out for a long time with suppressing cavitation becomes possible by adding a different kind of inactive gas in the fluid storage part to increase the pressure in the storage part.

In addition, the present invention provides a thruster configured to obtain thrust force by jetting out the vapors from the jet orifice using one the vapor jet systems according to the present invention above. By using the vapor jet system according to the present invention for a thruster, it becomes possible to generate stable thrust force for a long time.

Effect of the Invention

According to the present invention, the pressure in a container(s) can be increased to be higher than the saturated vapor pressure of any of the liquid(s) by storing two or more kinds of mutually-insoluble liquids in the containers or by storing one kind of liquid and at least one kind of inactive gas having a composition different from the liquid, thus occurrence of cavitation can be suppressed and it becomes possible to continuously jet out only gases while suppressing.

BRIEF DESCRIPTION OF THE DRAWINGS

FIG. 9 Photographs showing behaviors of the liquid propellant when a vapor jet experiment was conducted using the vapor jet system of comparative examples (from the upper side, nozzle diameter of 0.4 mm, 0.6 mm, 0.8 mm).

FIG. 10 Photographs showing behaviors of the liquid propellant when a vapor jet experiment was conducted using the vapor jet system of FIG. 8 (from the upper side, nozzle diameter of 0.6 mm, 0.8 mm, 1.0 mm).

DESCRIPTION OF THE EMBODIMENTS OF THE INVENTION

In the following, embodiments of the vapor jet system according to the present invention will be explained with figures. In this regard, it should be noted that the vapor jet system of the present invention is not limited to the specific particular configurations shown in the respective figures and related explanations, and the vapor jet system can be appropriately modified within the scope of the present invention. For example, the vapor jet system can be configured using three or more kinds of mutually insoluble liquids (In the configuration of FIG. 1, liquid fuel storage containers should be provided so that the number of the containers is equal to the numbers of the kinds of the liquids, as liquid fuel storage container 2A, 2B, 2C . . . , and they should join together at the pipe similarly to the configuration of FIG. 1), and two or more kinds of inactive gases can be used when using a vapor jet system using one kind of liquid and inactive gases. Furthermore, even in a case where two or more kinds of mutually insoluble liquids are used, it is possible to configure the vapor jet system of the present invention by further injecting one or more kind of inactive gas into the liquid fuel storage container(s).

Configuration of Vapor Jet System

Figure 1:
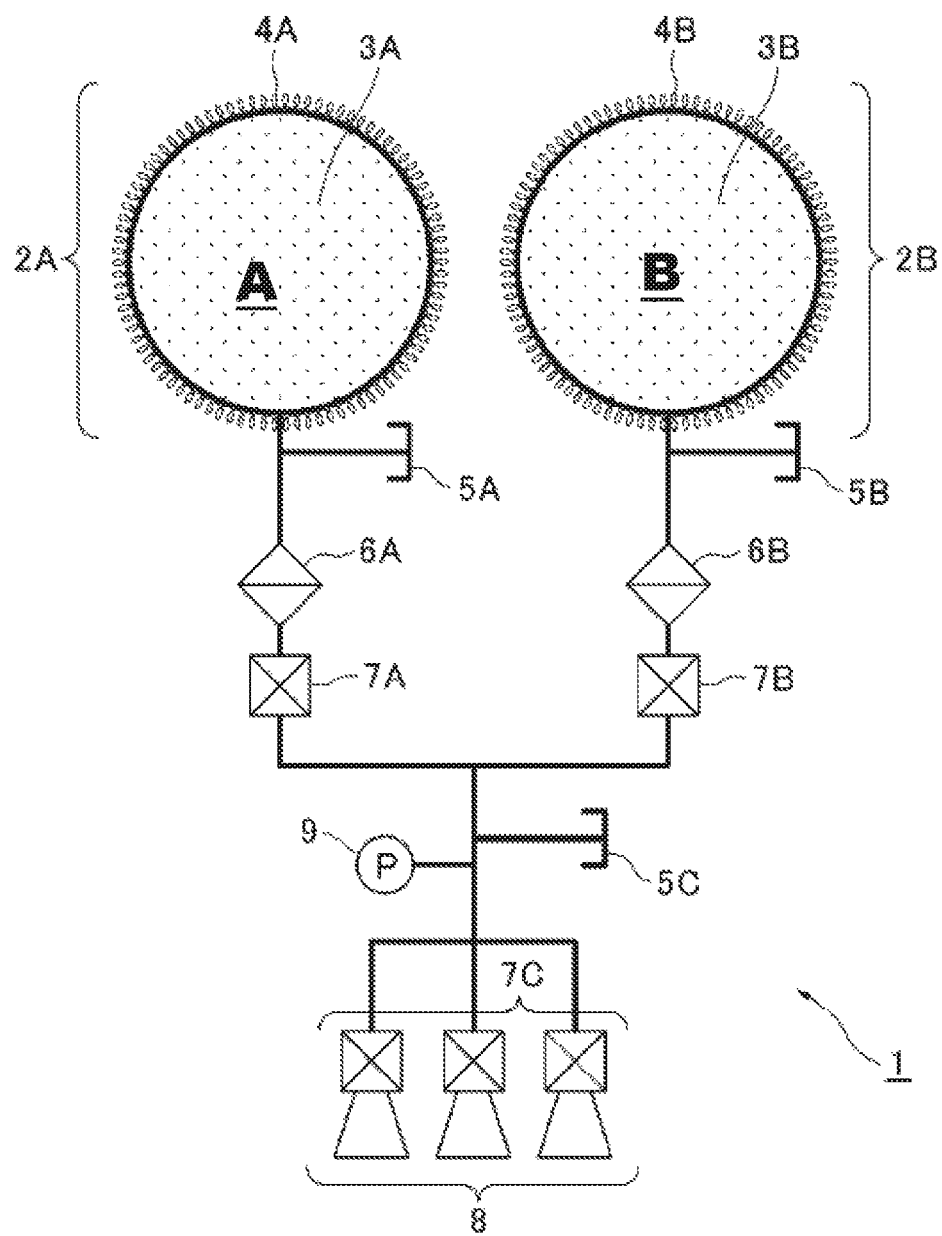
FIG. 1 A system diagram of the vapor jet system (thruster) according to the first embodiment of the present invention.

FIG. 1 shows an example of a system diagram of the vapor jet system 1 (thruster) usable for a thruster system for a small spacecraft according to the first embodiment of the present invention. The vapor jet system 1 comprises: liquid fuel storage containers 2A, 2B made of aluminum, SUS (stainless steel), or the like, each of which stores each of mutually insoluble liquid gases A, B; inject and eject valves 5A, 5B for injecting and ejecting liquid gases A, B into or from the liquid fuel storage containers 2A, 2B; filters 6A, 6B for preventing impurities and fuels in liquid state from passing through; latch type electromagnetic valves 7A, 7B for controlling moving, to the side of propellant valves 7C, of vapors of the liquid gases A, B which passed through the filters 6A, 6B; the electromagnetic valves (propellant valves) 7C for controlling jetting out of the vapors of the liquid gases A, B from jet orifices 8; and the jet orifices 8 for jetting out vapors of the liquid gases A, B. Foam metals 3A, 3B made of, for example, copper, SUS, or the like with about 95% of airspace rate are attached to the inner walls of the liquid fuel storage containers 2A, 2B using adhesive agents, respectively. And, heaters 4A, 4B are attached to the outer walls of the liquid fuel storage containers 2A, 2B around their whole circumferences, respectively. Line segments connecting respective components in FIG. 1 indicate pipes. In addition, a pressure sensor 9 for detecting pressure in the pipes, and inject and eject valve 5C for using in a ground test etc. for checking existence of a leak by injecting helium gas etc. while closing the propellant valve 7C, are provided in the vapor jet system 1.

Operation of the Vapor Jet System

In the following, the operation of the vapor jet system 1 will be explained. It is assumed here that opening and closing of the respective electromagnetic valves (jet control part) and operational control of the heaters, respective sensors etc. are performed by remote control etc. via arbitrary control circuits (not shown in figures), and that injecting of liquid (gas) and ejecting of liquid (gas) from the respective inject and eject valves are performed typically by an operator. However, specific means for performing those controls/operations can be appropriately changed according to embodiments (The same holds true for the subsequent embodiments).

When using the vapor jet system 1, different kinds of liquid gases A, B are firstly injected from the inject and eject valves 5A, 5B into the liquid fuel storage containers 2A, 2B, respectively, and the liquid gases A, B in liquid state are held in the airspace parts in the foam metals 3A, 3B by surface tension. Respective vapors generated by vaporizing the liquid gases A, B in the liquid fuel storage containers 2A, 2B are released from the liquid fuel storage containers 2A, 2B via the pipes. After the vapors pass through the filters 6A, 6B, the latch type electromagnetic valves 7A, 7B are opened and those vapors join together in the pipe. At this time, the pressure in the space storing the vapors in the liquid fuel storage containers 2A, 2B is higher than the saturated vapor pressures of the liquid gases A, B. This gas pressure is monitored by the pressure sensor 9. When the propellant valves 7C of the thruster are opened in a state where the latch type electromagnetic valves 7A, 7B are opened, the vapors which joined together are jetted out from the jet orifices 8 outward and a thrust force is generated. Since the above pressure at the beginning of the jetting out is higher than the saturated vapor pressures of the liquid gases A, B, it becomes possible to continuously jet out for a long time without occurrence of cavitation.

Explanations were presented above about the vapor jet system 1 of FIG. 1 operated using two kinds of liquid gases (or they can be liquids in the broad sense of the term), but it is also possible to configure the vapor jet system 1 of FIG. 1 as a vapor jet system operated using one kind of liquid gas (or liquid in the broad sense of the term) and at least one kind of inactive gas. In this case, one of the liquid fuel storage containers 2A, 2B is filled with, not the liquid gas, but at least one kind of inactive gas (GN2, GHe etc. with high pressure). It is not necessary to attach a foam metal to the storage container (inactive gas storage container) filled with the inactive gas. Similarly to the case where two kinds of liquid gases are used, vapors of the liquid gas and the inactive gas join together in the pipe by opening the latch type electromagnetic valves 7A, 7B, and the pressure in the space storing the vapors becomes higher than the saturated vapor pressure of the liquid gas. When the propellant valves 7C of the thruster are opened in a state where the latch type electromagnetic valves 7A, 7B are opened, the vapors and the inactive gas which joined together are jetted out from the jet orifices 8 outward and a thrust force is generated. Since the above pressure at the beginning of the jetting out is higher than the saturated vapor pressures of the liquid gas, it becomes possible to continuously jet out for a long time without occurrence of cavitation. In intervals between a jetting out operation and a jetting out operation, temperatures of those liquid gases are recovered by heating the liquid gases A, B with the heaters 4A, 4B.

Figure 2:
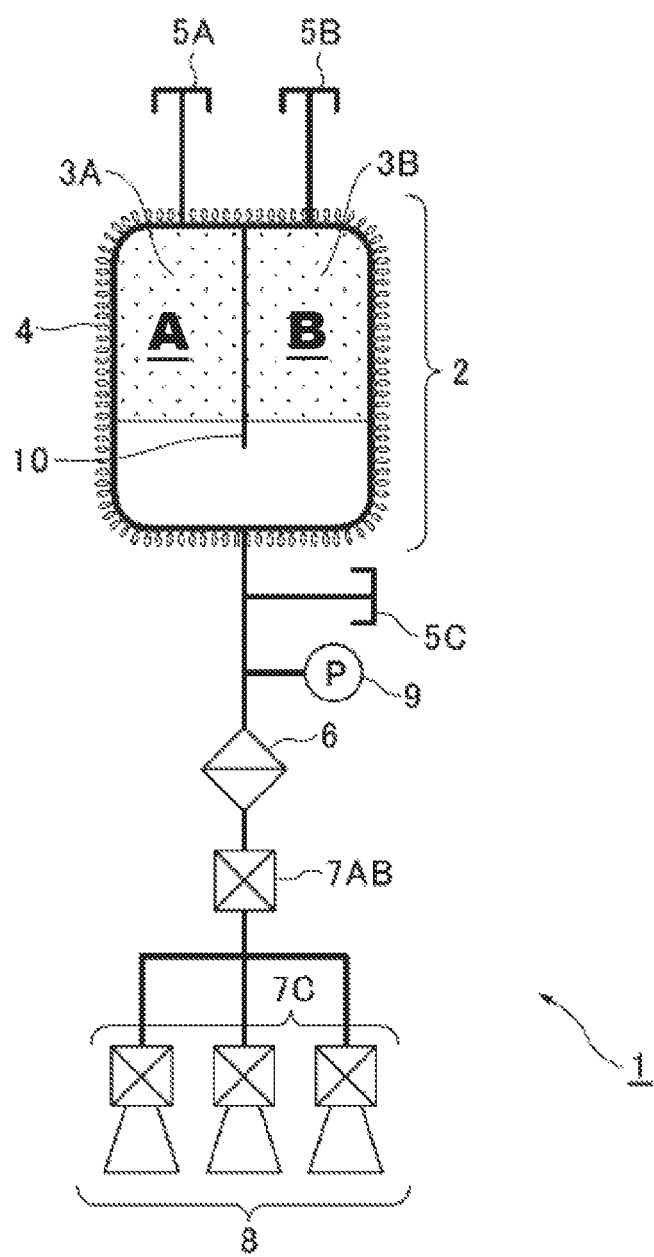
FIG. 2 A system diagram of the vapor jet system (thruster) according to the second embodiment of the present invention.

In the vapor jet system 1 of FIG. 1, the liquid fuel storage containers 2A, 2B storing the liquid gases A, B (or, a liquid fuel storage container and an inactive gas storage container) are provided as distinct containers, but they can be substituted with a single tank having a cross wall (a fluid storage container). FIG. 2 shows an example of a system diagram of the vapor jet system 1 (thruster) according to the second embodiment of the present invention configured using a single fluid storage container.

Configuration of Vapor Jet System

The vapor jet system 1 comprises: a fluid storage container 2 which stores mutually insoluble liquid gases A, B, or a liquid gas A and at least one kind of inactive gas respectively in spaces separated by a cross wall (made of aluminum, SUS, or the like); inject and eject valves 5A, 5B for injecting and ejecting liquid (gas) of the liquid gas and inactive gas into or from the fluid storage container 2; a filter 6 for preventing impurities and fuels in liquid state from passing through; a latch type electromagnetic valve 7AB for controlling moving, to the side of propellant valves 7C, of vapors of the liquid gas which passed through the filter or the inactive gas; the electromagnetic valves (propellant valves) 7C for controlling jetting out of the vapors of the liquid gas and the inactive gas from jet orifices 8; and the jet orifices 8 for jetting out vapors of the liquid gas and the inactive gas. Foam metals 3A, 3B are attached to the inner walls of the respective spaces separated by the cross wall 10 in the fluid storage container 2 (they are not needed on the inner wall of the space storing an inactive gas), and, a heater 4 is attached to the outer wall around the whole circumference. Line segments connecting respective components in FIG. 2 indicate pipes. In addition, a pressure sensor 9 for detecting pressure in the pipes, and inject and eject valve 5C for using in a ground test etc. are provided in the vapor jet system 1, similarly to the configuration of FIG. 1.

Operation of the Vapor Jet System

When using the vapor jet system 1, different kinds of liquid gases A, B, or a liquid gas and at least one kind of inactive gas, are firstly injected from the inject and eject valves 5A, 5B into the spaces separated by the cross wall 10 in the fluid storage container 2, respectively, and the liquid gas(es) is (are) held in the airspace parts in the foam metal(s) and the inactive gas is held in the corresponding space, respectively (the inactive gas may flow into the space on the side storing the liquid gas). Vapors of the liquid gases A, B, or vapors of the liquid gas and the inactive gas join together in the fluid storage container 2, and are released from the fluid storage container 2 via the pipes. The pressure in the space storing the vapors in the fluid storage container 2 is higher than the saturated vapor pressure of the liquid gas. This gas pressure is monitored by the pressure sensor 9. When the latch type electromagnetic valve 7AB is opened, and the propellant valves 7C of the thruster are further opened, vapors released from the fluid storage container 2, or the vapors and the inactive gas are jetted out from the jet orifices 8 outward and a thrust force is generated. Since the above pressure at the beginning of the jetting out is higher than the saturated vapor pressure(s) of the liquid gas(es), it becomes possible to continuously jet out for a long time without occurrence of cavitation. In intervals between a jetting out operation and a jetting out operation, the temperature of the liquid gas(es) is (are) recovered by heating the liquid gas(es) with the heater 4.

Figure 3:
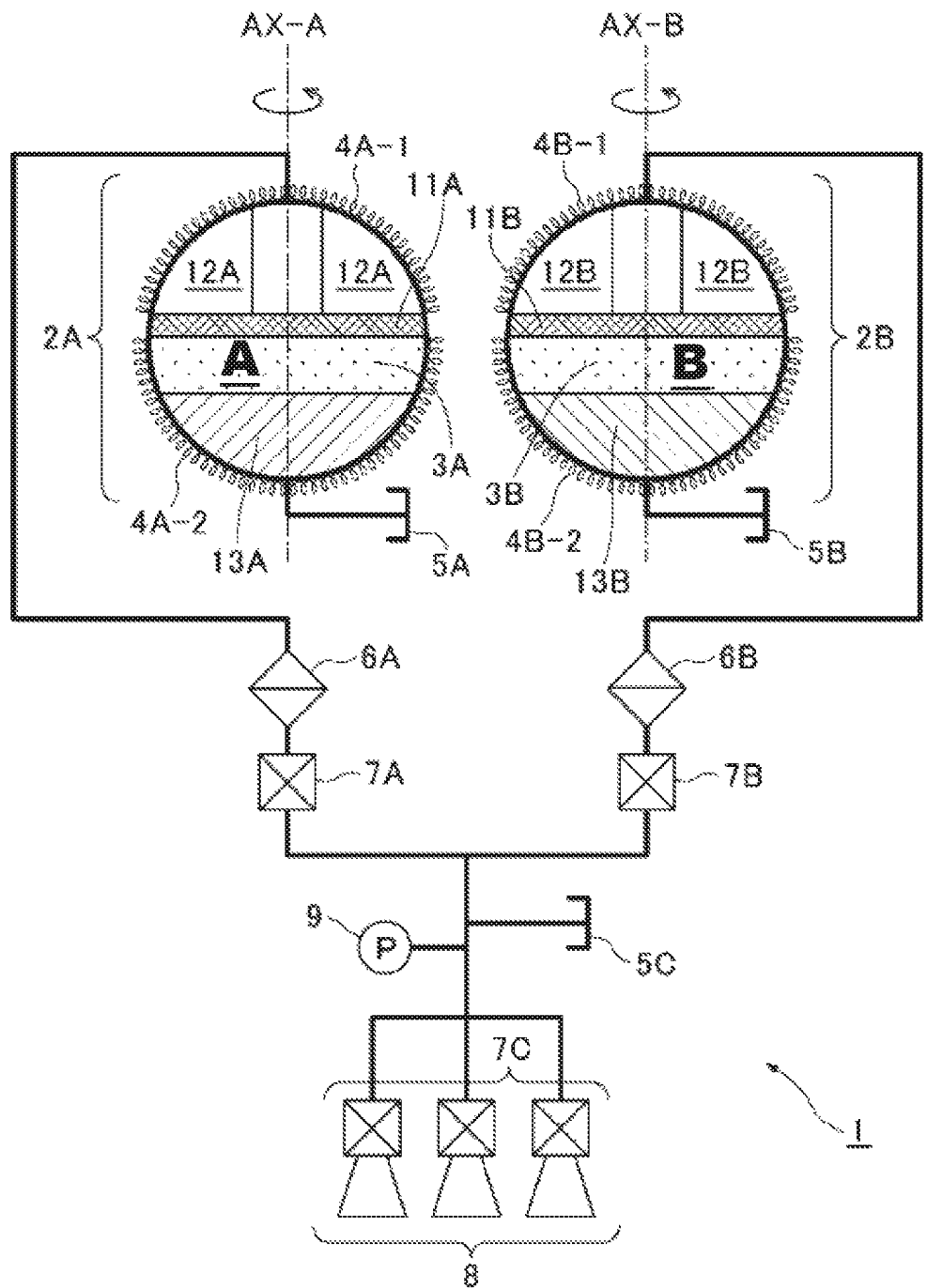
FIG. 3 A system diagram of the vapor jet system (thruster) according to the third embodiment of the present invention.

As another embodiment, a net type object, a foam metal, a flat plate can be placed in the liquid storage containers as described in the Patent Document 3. FIG. 3 shows an example of a system diagram of the vapor jet system 1 (thruster) according to the third embodiment of the present invention configured using them.

Configuration of Vapor Jet System

The vapor jet system 1 comprises: liquid fuel storage containers 2A, 2B each of which stores each of mutually insoluble liquid gases A, B; inject and eject valves 5A, 5B for injecting and ejecting liquid gases A, B into or from the liquid fuel storage containers 2A, 2B; filters 6A, 6B for preventing impurities and fuels in liquid state from passing through; latch type electromagnetic valves 7A, 7B for controlling moving, to the side of propellant valves 7C, of vapors of the liquid gases A, B which passed through the filters; the electromagnetic valves (propellant valves) 7C for controlling jetting out of the vapors of the liquid gases A, B from jet orifices 8; and the jet orifices 8 for jetting out vapors of the liquid gases A, B.

Differently from the configuration of FIG. 1, net type objects 11A, 11B made of SUS or the like are attached to the inner walls of the liquid fuel storage containers 2A, 2B using adhesive agents, respectively. By forming liquid films by surface tensions of liquid gases A, B in reticulations of those net type objects 11A, 11B, inner spaces of the liquid fuel storage containers 2A, 2B are separated into spaces storing vapors (upper side from the net type objects 11A, 11B in FIG. 3) and spaces storing liquids (lower side from the net type objects 11A, 11B in FIG. 3) (see FIG. 1, [0032] of the Patent Document 3). In addition, foam metals 3A, 3B storing each of liquid gasses A, B in liquid state in their airspaces, respectively, are attached to the inner walls of the liquid fuel storage containers 2A, 2B adjacent to the net type objects 11A, 11B. In this regard, the spaces storing liquids can be fully occupied by the foam metals 3A, 3B, but it is also possible that the foam metals 3A, 3B are placed only partially in the spaces storing the liquids as shown in FIG. 3 and that the remaining spaces are occupied by the liquid gases 13A, 13B in liquid state since gas-liquid separation is conducted by the net type objects 11A, 11B in this embodiment.

Further, heaters 4A-1, 4A-2 and 4B-1, 4B-2 are attached to the outer walls of the liquid fuel storage containers 2A, 2B, respectively. By heating with the heaters 4A-1 and 4B-1, the temperatures of the inner spaces of the liquid fuel storage containers 2A, 2B are controlled so that the temperatures in the spaces storing vapors are higher than the temperatures in the spaces storing liquids. In this way, inversion of spaces storing vapors and spaces storing liquids is prevented (see [0014] in the Patent Document 3). And, by heating with the heaters 4A-2 and 4B-2 in intervals of jetting out, the temperatures of the respective liquid gases are recovered as described above. In this regard, although not shown in figures, it is preferable to appropriately provide heaters to pipes from the liquid fuel storage containers 2A, 2B to the jet orifices 8 to keep the temperature in the pipes higher than the temperatures in the liquid fuel storage containers 2A, 2B to prevent vapors from returning to liquids (The same holds true for other embodiments). In this way, a temperature gradient is realized which moves upward from the spaces storing the liquids to the spaces storing the vapors of the liquid fuel storing containers 2A, 2B, and toward the pipes outside of the containers. In addition, a plurality of flat plates 12A, 12B made of SUS or the like are attached to the inner walls of the liquid fuel storage containers 2A, 2B by adhesive agents, and it is possible to capture floating droplets by the flat plates 12A, 12B by rotating the liquid fuel storage containers 2A, 2B around the rotation axes AX-A, AX-B (using arbitrary driving circuits etc. not shown in figures), respectively while operating the vapor jet system 1 (see [0043] in the Patent Document 3).

Operation of the Vapor Jet System

When using the vapor jet system 1, different kinds of liquid gases A, B are firstly injected from the inject and eject valves 5A, 5B into the liquid fuel storage containers 2A, 2B, respectively, and the liquid gases A, B in liquid state are held in the airspace parts in the foam metals 3A, 3B, and liquid films are formed in the reticulations of the net type objects 11A, 11B. Respective vapors generated by vaporizing the liquid gases A, B in the liquid fuel storage containers 2A, 2B are released from the liquid fuel storage containers 2A, 2B via the pipes. After the vapors pass through the filters 6A, 6B, the latch type electromagnetic valves 7A, 7B are opened and those vapors join together in the pipe. At this time, the pressure in the space storing the vapors in the liquid fuel storage containers 2A, 2B is higher than the saturated vapor pressures of the liquid gases A, B. This gas pressure is monitored by the pressure sensor 9. When the propellant valves 7C of the thruster are opened in a state where the latch type electromagnetic valves 7A, 7B are opened, the vapors which joined together are jetted out from the jet orifices 8 outward and a thrust force is generated. Since the above pressure at the beginning of the jetting out is higher than the saturated vapor pressures of the liquid gases A, B, it becomes possible to continuously jet out for a long time without occurrence of cavitation.

The vapor jet system 1 of FIG. 3 operated using two kinds of liquid gases is described above, but this vapor jet system 1 can also be operated similarly with similar configurations in an embodiment where the vapor jet system 1 is operated using one kind of liquid gas and at least one kind of inactive gas except the difference in that a net type object, a foam metal, a flat plate, or a heater is not required to be provided in the container storing an inactive gas (gas storage container) in the liquid storage containers 2A, 2B.

Figure 4:
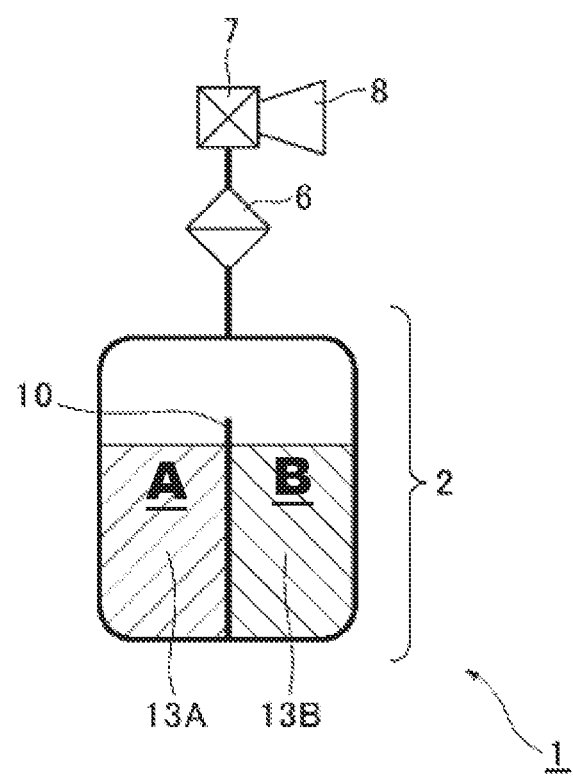
FIG. 4 A system diagram of the vapor jet system (spray) according to the fourth embodiment of the present invention.

The vapor jet system according to the present invention can be used for other objects than a thruster. As an example, a system diagram of the vapor jet system 1 according to the fourth embodiment of the present invention configured as a vapor jet spray is shown in FIG. 4 as an example.

Configuration of Vapor Jet System

The vapor jet system 1 comprises: a liquid storage container 2 (aluminum can or the like) in which a cross wall 10 made of aluminum is provided and which stores mutually insoluble liquid gases A, B respectively; a filter 6 for preventing impurities and the liquid gases in liquid state from passing through; a nozzle control part 7 which controls jetting out of vapors of the liquid gases A, B from a jet orifice 8; and the jet orifice 8 for jetting out vapors of the liquid gases A, B. The respective liquid gases A, B in liquid state (13A, 13B) are stored respectively in the spaces separated by the cross wall 10.

Operation of the Vapor Jet System

When using the vapor jet system 1, it is assumed that different kinds of liquid gases A, B were injected into the spaces separated by the cross wall 10 in the liquid storage container 2 in advance (when manufacturing the spray). At this time, the pressure in the space storing vapors in the liquid storage container 2 is higher than the saturated vapor pressures of the liquid gases A, B. Respective vapors generated by vaporization of the liquid gases A, B in the liquid storage container 2 pass through the pipe and are released from the liquid storage container 2. After passing through the filter 6, they are jetted out from the jet orifice 8 by operating the nozzle (air nozzle) control part 7. Since the above pressure at the beginning of the jetting out is higher than the saturated vapor pressures of the liquid gases A, B, it becomes possible to continuously jet out for a long time without occurrence of cavitation.

The vapor jet system 1 of FIG. 4 operated using two kinds of liquid gases is described above, but this vapor jet system 1 can also be operated in an embodiment where the vapor jet system 1 is operated using one kind of liquid gas and at least one kind of inactive gas. Specifically, by enclosing a liquid gas and at least one kind of inactive gas in advance in a liquid (fluid) storage container 2 (a cross wall 10 is not required), the pressure in the space storing the vapors in the liquid storage container 2 is higher than the saturated vapor pressure of the liquid gas and thus it becomes possible to continuously jet out for a long time without occurrence of cavitation.

Figure 5:
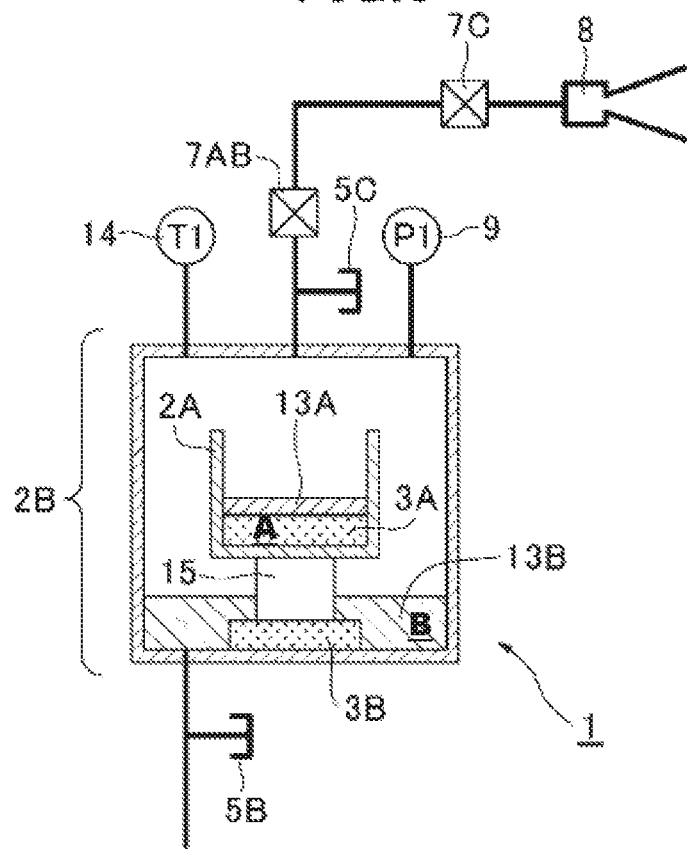
FIG. 5 A system diagram of the vapor jet system (for experiment) according to the fifth embodiment of the present invention.

The vapor jet system 1 with the configuration shown in FIG. 5 was made and an experiment of jetting out was conducted.

In the vapor jet system 1 of FIG. 5, a liquid fuel storage container 2A of 0.1 L (acrylic) is connected to the inside of a liquid fuel storage container 2B of 1.0 L (acrylic) via a spacer 15 (aluminum). The liquid fuel storage container 2A is filled with 28% (concentration by percent by mass) ammonia water 13A, and the liquid fuel storage container 2B is filled with liquid butane 13B (The liquid fuel storage container 2A is filled with ammonia water 13A first, and stored in the liquid fuel storage container 2B, and then liquid butane 13B is injected from a inject and eject valve 5B connected to the bottom of the liquid fuel storage container 2B. Foam metals 3A, 3B made of nickel are inserted into the respective containers. The inject and eject valve 5C is for ground tests such as checking of a leak.). The mixture vapor pressure of the ammonia water and the liquid butane is monitored by a temperature sensor 14 and a pressure sensor 9 connected to the liquid fuel storage container 2B. Jetting out of gases outward is conducted by opening an electromagnetic valve 7C connected shortly before a jet orifice (nozzle) 8. The performance of the vapor jet system was evaluated in the following viewpoints:

(1) Pressure of the mixed vapors of ammonia water and liquid butane measured by the temperature sensor 14 and the pressure sensor 9 connected to the liquid fuel storage container 2B.

(2) Measurement value by the pressure sensor 9 at the time of occurrence of cavitation confirmed from images of a high-speed camera (imaging speed: 120 fps) (Since acrylic plastic is used as materials of the liquid fuel storage container 2A, 2B, existence or non-existence of occurrence of cavitation from inside of the liquid fuels stored in the containers could be captured.).

Experiment with a Comparative Example

Figure 6:
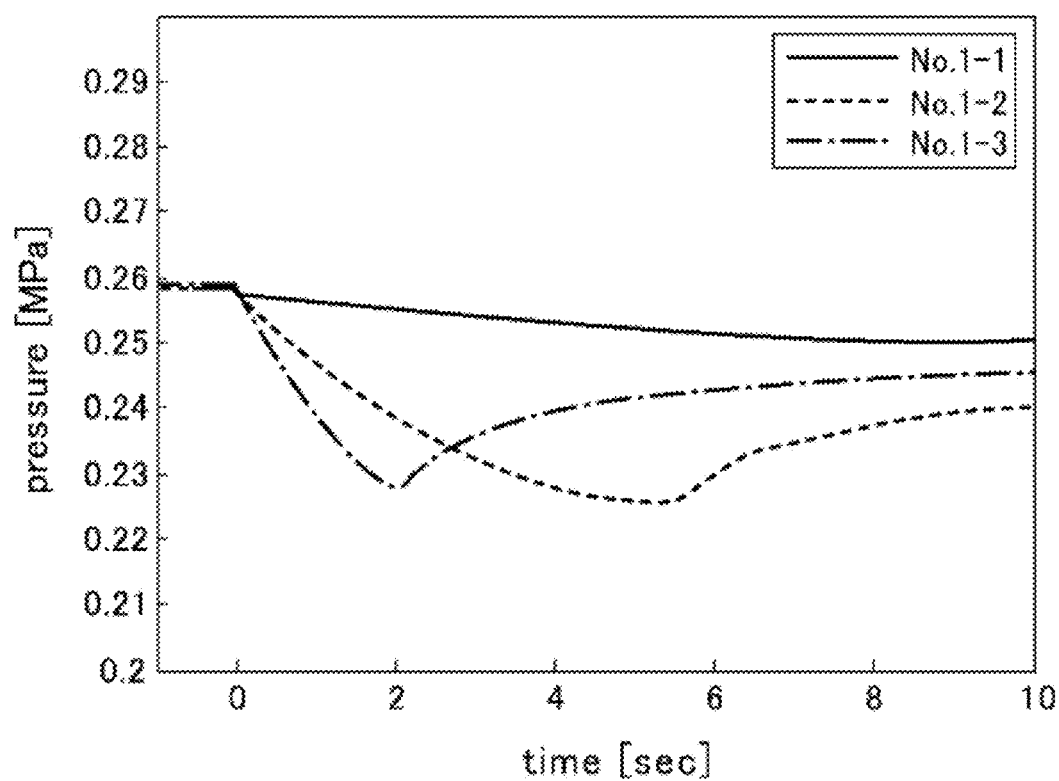
FIG. 6 A graph showing the change of the pressure in the container when a vapor jet experiment was conducted using the vapor jet system of comparative examples.

First, vapor jets were conducted without filling the liquid fuel storage container 2A with ammonia water and with filling the liquid fuel storage container 2B with liquid butane in the configuration of FIG. 5. The vapor jets were conducted with three types of nozzle throat diameter of 0.4 mm, 0.6 mm, 0.8 mm, respectively, and pressure in the container at the time of occurrence of cavitation was measured in the respective throat diameters. FIG. 6 shows the change of the pressure in the liquid fuel storage container 2B in the vapor jet experiments. In FIG. 6, the solid line corresponds to the nozzle throat diameter of 0.4 mm (No. 1-1), the dashed line corresponds to 0.6 mm (No. 1-2), and the dot-and-dash line corresponds to 0.8 mm (No. 1-3), respectively. In addition, initial temperature (before decompression by jetting out) and initial pressure in the liquid fuel storage container 2B, pressure in the liquid fuel storage container 2B at the time of occurrence of cavitation (bubbles), vapor pressure of butane at the initial temperature, and jetting duration from the beginning of the vapor jet to the occurrence of cavitation, in the experiments with the respective nozzle throat diameters, are shown in Table 1 below.

TABLE 1

| No. | throat diameter [mm] | initial temperature [° C.] | initial pressure [MPa] | pressure at the time of generation of bubble [MPa] | vapor pressure of butane [MPa] | jet duration [sec] |
| --- | --- | --- | --- | --- | --- | --- |
| 1-1 | 0.4 | 26.9 | 0.258 | 0.255 | 0.257 | 2.2 |
| 1-2 | 0.6 | 27.1 | 0.258 | 0.255 | 0.259 | 0.2 |

TABLE 1-continued

| No. | throat diameter [mm] | initial temperature [° C.] | initial pressure [MPa] | pressure at the time of generation of bubble [MPa] | vapor pressure of butane [MPa] | jet duration [sec] |
|---|---|---|---|---|---|---|
| 1-3 | 0.8 | 27.1 | 0.259 | 0.253 | 0.259 | 0.2 |
| 2-1 | 0.4 | 27.2 | 0.296 | 0.260 | 0.260 | 42.4 |
| 2-2 | 0.6 | 27.4 | 0.288 | 0.261 | 0.261 | 1.9 |
| 2-3 | 0.8 | 27.1 | 0.296 | 0.258 | 0.259 | 1.4 |

Here, "vapor pressure of butane" is the pressure P calculated using the following Antoine equation (1) from the initial temperature (T is absolute temperature):

[Numeral 1]

$$\log P[kPa] = A - \frac{B}{T[K] + C} \quad (1)$$
$$A = 5.93266, B = 935.773, C = -34.361$$

As a result of the experiments, it was confirmed that, in the conventional vapor jet system with a single liquid gas as single butane, the initial pressure in the liquid fuel storage container 2B was the saturated vapor pressure of liquid butane, and that cavitation occurred shortly after jetting out of vapors regardless of the nozzle throat diameter, namely regardless of decompression speed.

(Experiment with a System According to the Present Invention)

Figure 7:
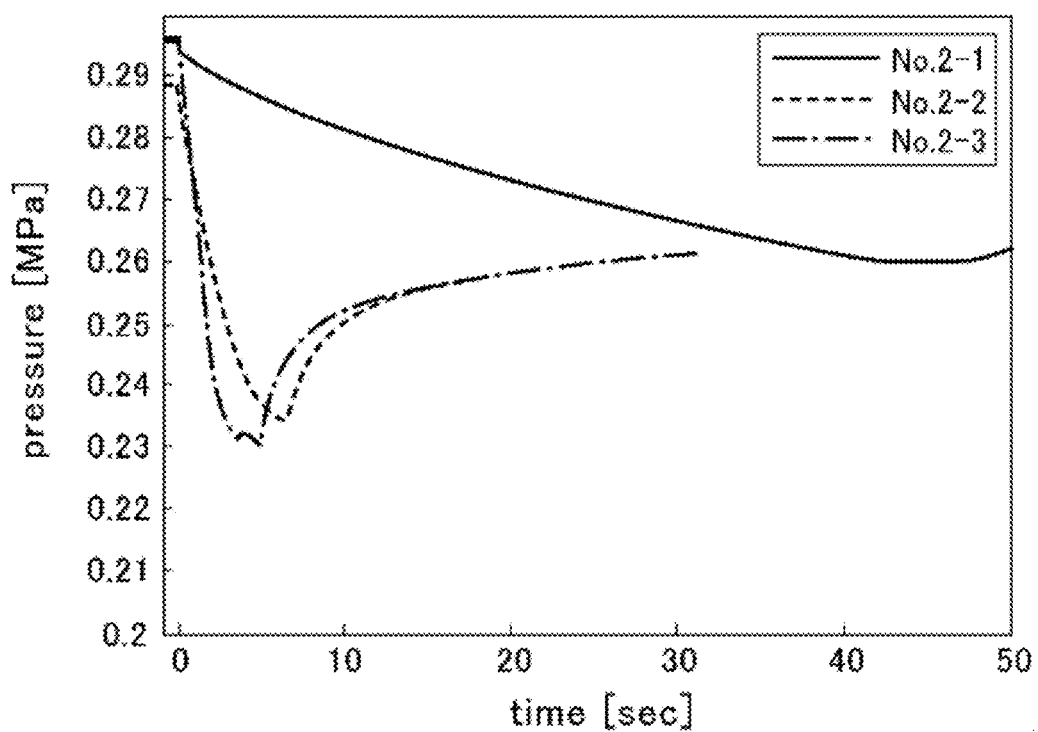
FIG. 7 A graph showing the change of the pressure in the container when a vapor jet experiment was conducted using the vapor jet system of FIG. 5.

Next, ammonia water was stored in the liquid fuel storage container 2A, liquid butane was stored in the liquid fuel storage container 2B, and vapor jets were conducted with three types of nozzle throat diameter of 0.4 mm, 0.6 mm, 0.8 mm. FIG. 7 shows the change of the pressure in the liquid fuel storage container 2B when the vapor jet experiments were conducted. In FIG. 7, the solid line corresponds to the nozzle throat diameter of 0.4 mm (No. 2-1), the dashed line corresponds to 0.6 mm (No. 2-2), and the dot-and-dash line corresponds to 0.8 mm (No. 2-3), respectively. In addition, initial temperature and initial pressure in the liquid fuel storage container 2B, pressure in the liquid fuel storage container 2B at the time of occurrence of cavitation, vapor pressure of butane at the initial temperature, and jetting duration from the beginning of the vapor jet to the occurrence of cavitation, in the experiments with the respective nozzle throat diameters, are shown in Table 1 above.

As a result of the experiments, the pressure in the container before the above jet was higher than the saturated vapor pressure of liquid butane by about 30-40 kPa. It was confirmed that, after vapor jets, cavitation occurred from the bottom of the liquid fuel storage container 2B after the pressure fell below the saturated vapor pressure of single butane calculated from the temperature sensor 14 regardless of decompression speed. Therefore, it was confirmed that occurrence of cavitation can be delayed by the vapor pressure of ammonia water relative to the case of vapor jet with single butane.

Figure 8:
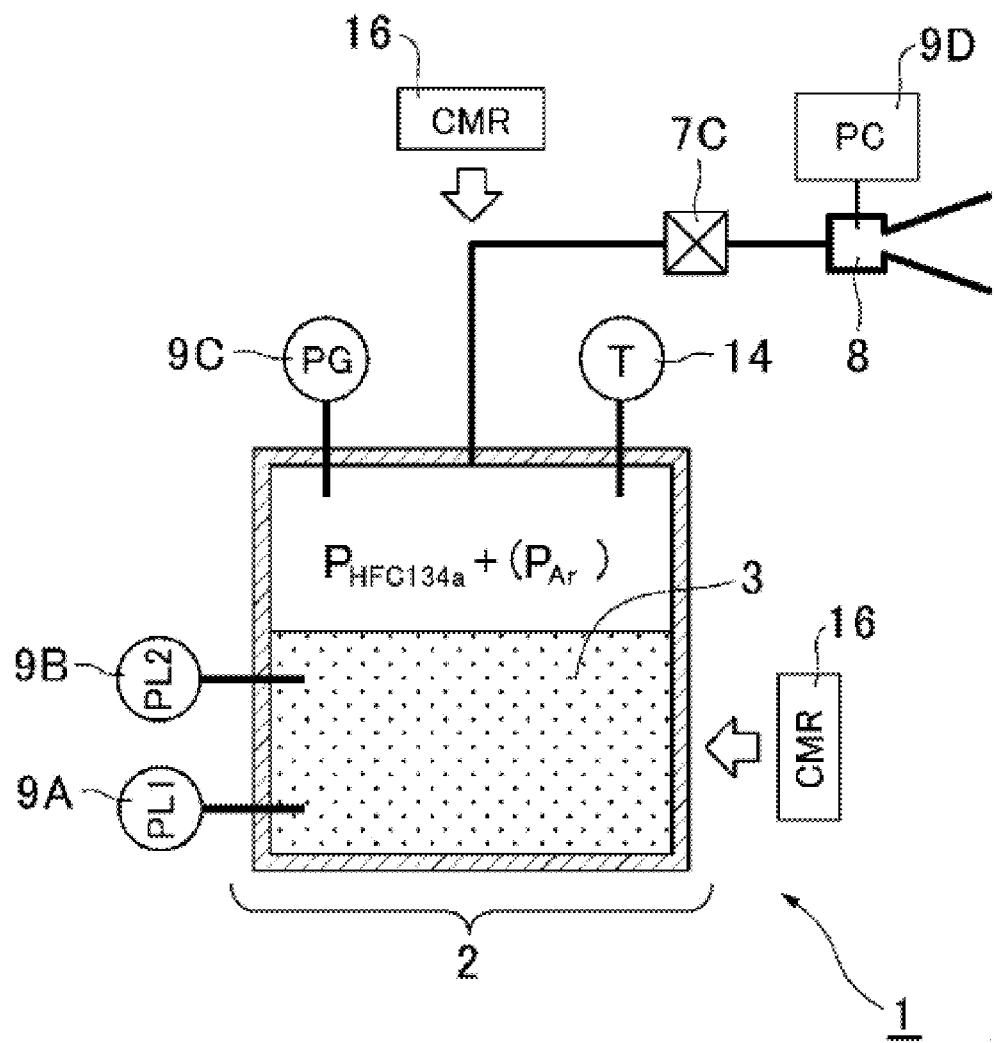
FIG. 8 A system diagram of the vapor jet system (for experiment) according to the sixth embodiment of the present invention.

A vapor jet system for experiment with configurations shown in FIG. 8 was made. Experiments with microgravity which utilize a drop tower were conducted in order to confirm that performance of jetting out for many seconds is improved by suppressing cavitation. In the present experiments, jetting experiments were conducted in the same environment for one liquid type and 1 liquid+(plus) 1 gas type thruster system and the gas-liquid separation performance was compared. The present experiments were conducted at the drop tower of 50 m in Akabira City, Hokkaido. The gravity level is $10^{-3}$ G, and the falling duration is about 2.5 sec.

(Experiment Device)

A foam metal 3 (Duocel 40PPI6 by ERG) was constructed in a fluid storage container 2 made of 0.3 L polycarbonate, and it was filled with liquid HFC 134a to the same height as the foam metal 3. Behaviors of liquid propellant in the fluid storage container 2 while jetting out were recorded by four pressure sensors 9A~9D, one temperature sensor 14, a high speed camera 16 (imaging speed: 120 fps). The pressure sensors measured the ullage part (PG) storing vapors of HFC 134a, liquid part (PL1, PL2), and nozzle chamber part (PC) of jet orifice 8, respectively. The temperature sensor measured temperature of the ullage (gas). In addition, the flow rate was adjusted by changing the nozzle throat diameter.

(Experimental Items)

Differences in behaviors of the liquid propellant between a case where single HFC 134a is jetted out (corresponding to one liquid type) and a case where Ar is added to HFC134a (corresponding to 1 liquid+(plus) 1 gas type) were observed with changing the nozzle throat diameter. By controlling the electromagnetic valve 7C by a microcomputer (not shown in figures), jetting outs were conducted for 1.6 seconds duration from "0.2 second after" to "1.8 seconds after" the dropping of a capsule.

(Experimental Result)

Experimental results are shown in Table 2 below.

TABLE 2

| No. | sample fluid | | nozzle diameter [mm] | judgment |
|---|---|---|---|---|
| 1-1 | HFC134a | — | 0.4 | ○ |
| 1-2 | HFC134a | — | 0.6 | ○ |
| 1-3 | HFC134a | — | 0.8 | x |
| 2-1 | HFC134a | Ar | 0.6 | ○ |
| 2-2 | HFC134a | Ar | 0.8 | ○ |
| 2-3 | HFC134a | Ar | 1.0 | x |

In Table 2, "judgment" is defined as "O (circle mark)" when the liquid propellant is still held by the foam metal when jetting out, and it is defined as "X (cross mark)" when the liquid propellant is not held, in that ascension of the gas-liquid interface was observed, from images taken by the high-speed camera 16.

When using single HFC134a (No. 1-1~1-3), the liquid propellant was held in the foam metal in jetting out with φ (phai, nozzle diameter) of 0.4 mm, 0.6 mm, but the liquid propellant was not held with φ (phai) of 0.8 mm. FIG. 9 shows photographs of the liquid propellant when a jetting experiment was conducted (2.0 seconds after start of fall) using single HFC 134a (from the upper side, nozzle diameter of 0.4 mm, 0.6 mm, 0.8 mm). From FIG. 9, it is confirmed that the liquid propellant flowed out from the foam metal in the test case of φ (phai) 0.8 mm. In addition, according to pressure histories measured by the pressure sensors 9A~9D, the pressure is monotonically decreasing during jetting out in the pressure history of the case where the liquid propellant is held by the foam metal, but the pressure recovered in a later stage of the jetting out in the case No. 1-3 where the liquid propellant flowed out. It is considered that, in that case, the pressure rose since vaporization by cavitation was added to vaporization by evaporation.

On the other hand, the liquid propellant was held in the foam metal in a case where Ar is added to HFC 134a at φ (phai) 0.6 mm, 0.8 mm, but flowing out of the liquid propellant was observed at φ (phai) 1.0 mm. FIG. 10 shows photographs showing inside of the fluid storage container 2 after 2.0 seconds from start of falling of the respective test cases (from the upper side, nozzle diameter of 0.6 mm, 0.8 mm, 1.0 mm). According to the pressure histories measured by pressure sensors 9A~9D, it is observed that, in No. 2-2 and No. 2-3, the ullage pressure (PG) was below the partial pressure of HFC 134a (it was calculated using Antoine equation from the temperature value before the jetting out measured by the temperature sensor, and it corresponds to the pressure from which bubbles start to be generated from the liquid) at the later stage of the jetting out. Also from images of the high-speed camera 16 (FIG. 10), occurrence of bubbles with nozzle diameter φ (phi) 0.8 mm and 1.0 mm was measured. However, in the case of φ (phi) 0.8 mm with small flow rate, it was not enough to rise the gas-liquid interface. On the other hand, in the case of φ (phi) 1.0 mm, it is considered that the gas-liquid interface rose by bubbles accompanying cavitation in HFC 134a.

From the above test results, it was found that, for a same flow rate (nozzle throat diameter), flowing out of liquid propellant from the foam metal can be better suppressed in a test case where pressure is applied by Ar gas. Therefore, it was confirmed that suppressing of cavitation is effective for improving the continuous jet performance.

INDUSTRIAL APPLICABILITY OF THE INVENTION

The vapor jet system according to the present invention can be applied to, from a thruster for a small thrust system for planet, a spray, to arbitrary devices, methods, systems etc. for stably jetting out vapors.

EXPLANATION OF SYMBOLS

1 vapor jet system (thruster, spray)
2 liquid (fluid) storage container
2A, 2B liquid fuel (inactive gas) storage container
3, 3A, 3B foam metal
4, 4A(-1, 2), 4B(-1, 2) heater
5, 5A, 5B, 5C inject and eject valve
6, 6A, 6B filter
7, 7A, 7B, 7AB, 7C electromagnetic valve, nozzle control part
8 jet orifice
9, 9A, 9B, 9C, 9D pressure sensor
10 cross wall
11A, 11B net type object
12A, 12B flat plate
13A, 13B liquid
14 temperature sensor
15 spacer
16 high speed camera

The invention claimed is:

1. A vapor jet system comprising:
   a first storage container including an inner wall to which a first foam metal is attached;
   a first liquid held by the first foam metal;
   a first vapor generated by vaporization of the first liquid in the first storage container;
   a second storage container including an inner wall to which a second foam metal is attached;
   a second liquid held by the second foam metal;
   a second vapor generated by vaporization of the second liquid in the second storage container;
   a first filter that prevents the passage of liquids;
   a second filter that prevents the passage of liquids;
   a jet orifice connected to a vapor passage connected to each of the first storage container and the second storage container;
   a jet control part;
   a first heater positioned at the first storage container; and
   a second heater positioned at the second storage container, wherein
   the first liquid and the second liquid are mutually insoluble.

2. The vapor jet system according to claim 1, wherein the first liquid is liquid ammonia or ammonia water, and the second liquid is liquid butane.

3. The vapor jet system according to claim 1, wherein at least one storage container of the first storage container and the second storage container further comprises a flat plate.

4. The vapor jet system according to claim 2, wherein at least one storage container of the first storage container and the second storage container further comprises a flat plate.

5. A vapor jet system comprising:
   a single storage container;
   a separation wall positioned inside the single storage container;
   a first foam metal attached to an inner wall of the single storage container;
   a second foam metal attached to an inner wall of the single storage container, the second foam metal being separated from the first foam metal by the separation wall;
   a first liquid held by the first foam metal;
   a first vapor generated by vaporization of the first liquid in the single storage container;
   a second liquid held by the second foam metal;
   a second vapor generated by vaporization of the second liquid in the single storage container;
   a filter that prevents the passage of liquids;
   a jet orifice connected to a vapor passage connected to the single storage container;
   a jet control part; and
   a heater positioned at the single storage container, wherein
   the first liquid and the second liquid are mutually insoluble.

6. The vapor jet system according to claim 5, wherein the first liquid is liquid ammonia or ammonia water; and the second liquid is liquid butane.

7. A vapor jet system comprising:
   a first storage container including an inner wall to which a foam metal is attached;
   a liquid held by the foam metal;
   a vapor generated by vaporization of the liquid in the first storage container;
   a second storage container;

an inactive gas in the second storage container;
a first filter that prevents the passage of liquids;
a second filter that prevents the passage of liquids;
a jet orifice connected to a vapor passage connecting to the first storage container and the second storage container;
a jet control part; and
a heater positioned at the first storage container, wherein
the inactive gas has a composition different from the liquid.

8. A vapor jet system comprising:
a single storage container;
a separation wall positioned inside the single storage container;
a foam metal attached to an inner wall of the single storage container;
a liquid held by the foam metal;
a vapor generated by vaporization of the liquid in the single storage container;
an inactive gas in the single storage container;
a filter that prevents the passage of liquids;
a jet orifice connected to a vapor passage connecting to the single storage container;
a jet control part; and
a heater positioned at the single storage container, wherein
the inactive gas has a composition different from the liquid.

* * * * *